(12) United States Patent
Morita et al.

(10) Patent No.: US 11,283,317 B2
(45) Date of Patent: Mar. 22, 2022

(54) MOTOR COIL SUBSTRATE, MOTOR, AND METHOD FOR MANUFACTURING MOTOR COIL SUBSTRATE

(71) Applicant: IBIDEN CO., LTD., Ogaki (JP)

(72) Inventors: Haruhiko Morita, Ogaki (JP); Hitoshi Miwa, Ogaki (JP); Shinobu Kato, Ogaki (JP); Toshihiko Yokomaku, Ibi-gun (JP); Hisashi Kato, Ogaki (JP); Takahisa Hirasawa, Ogaki (JP); Tetsuya Muraki, Ogaki (JP); Takayuki Furuno, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 295 days.

(21) Appl. No.: 16/567,514

(22) Filed: Sep. 11, 2019

(65) Prior Publication Data
US 2020/0083769 A1    Mar. 12, 2020

(30) Foreign Application Priority Data

Sep. 12, 2018  (JP) .............................. JP2018-170808

(51) Int. Cl.
*H02K 3/04* (2006.01)
*H02K 1/22* (2006.01)
*H02K 3/32* (2006.01)

(52) U.S. Cl.
CPC .............. *H02K 3/04* (2013.01); *H02K 1/223* (2013.01); *H02K 3/32* (2013.01)

(58) Field of Classification Search
CPC .......... H02K 3/26; H02K 3/28; H02K 11/215; H02K 13/006; H02K 23/58; H02K 2203/03
See application file for complete search history.

(56) References Cited

U.S. PATENT DOCUMENTS

| 10,498,183 | B2* | 12/2019 | Dieleman | H02K 3/26 |
| 2009/0072651 | A1* | 3/2009 | Yan | H02K 15/0407 310/179 |
| 2011/0140564 | A1* | 6/2011 | Nomura | H02K 3/26 310/208 |
| 2011/0204732 | A1* | 8/2011 | Miyamoto | H02K 33/16 310/25 |

FOREIGN PATENT DOCUMENTS

JP    2007-124892 A    5/2007

* cited by examiner

*Primary Examiner* — Tran N Nguyen
*Assistant Examiner* — Leda T Pham
(74) *Attorney, Agent, or Firm* — Oblon, McClelland, Maier & Neustadt, L.L.P.

(57) ABSTRACT

A coil substrate for a motor includes a flexible substrate, and multiple coils formed on a surface of the flexible substrate. Each of the coils has a wiring having first wiring portions and second wiring portions extending from the first wirings respectively and is formed such that the first wiring portions extend parallel with respect to each other and that the second wiring portions extend not parallel to the first wirings, and the flexible substrate is formed to be formed around a magnet of a motor such that the first wiring portions form an angle that is substantially perpendicular to a rotation direction of the motor.

20 Claims, 8 Drawing Sheets

Direction of Electricity

Direction of Electricity

Direction of Electricity

Direction of Electricity

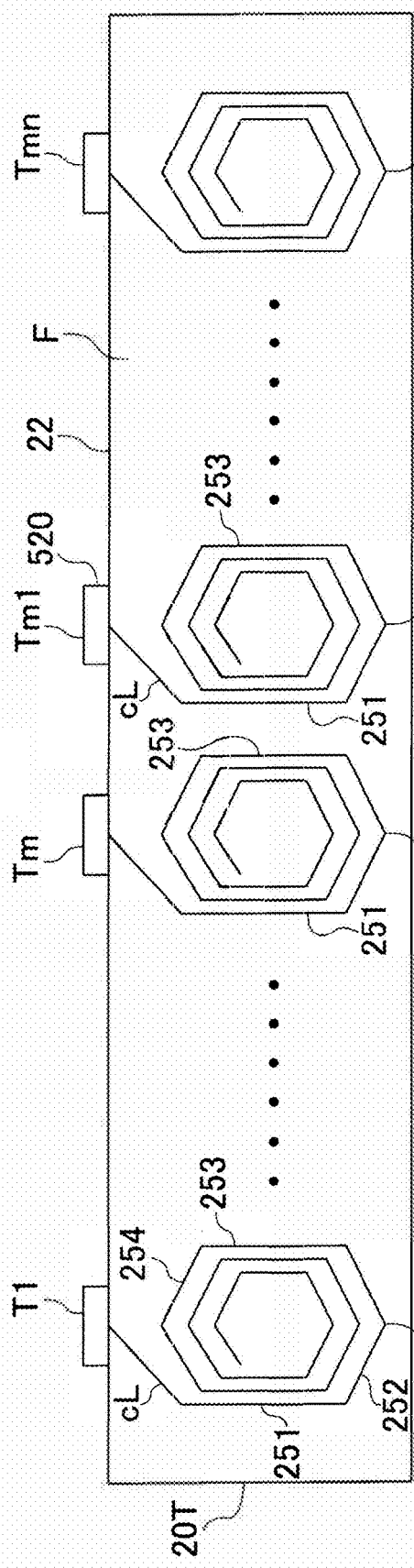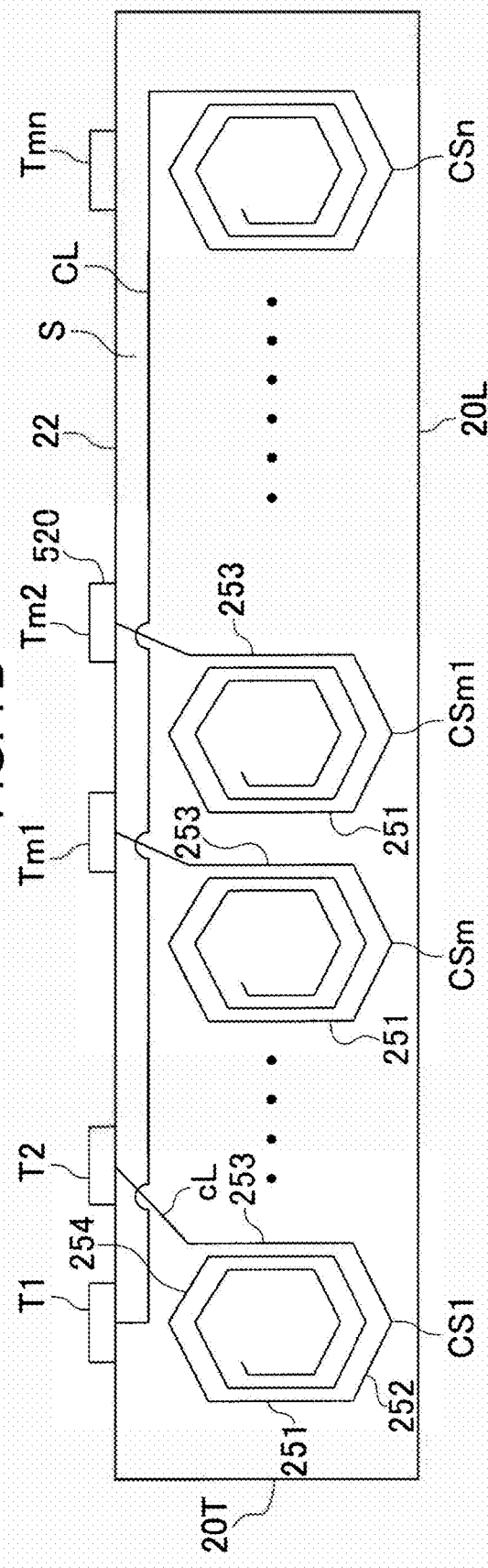

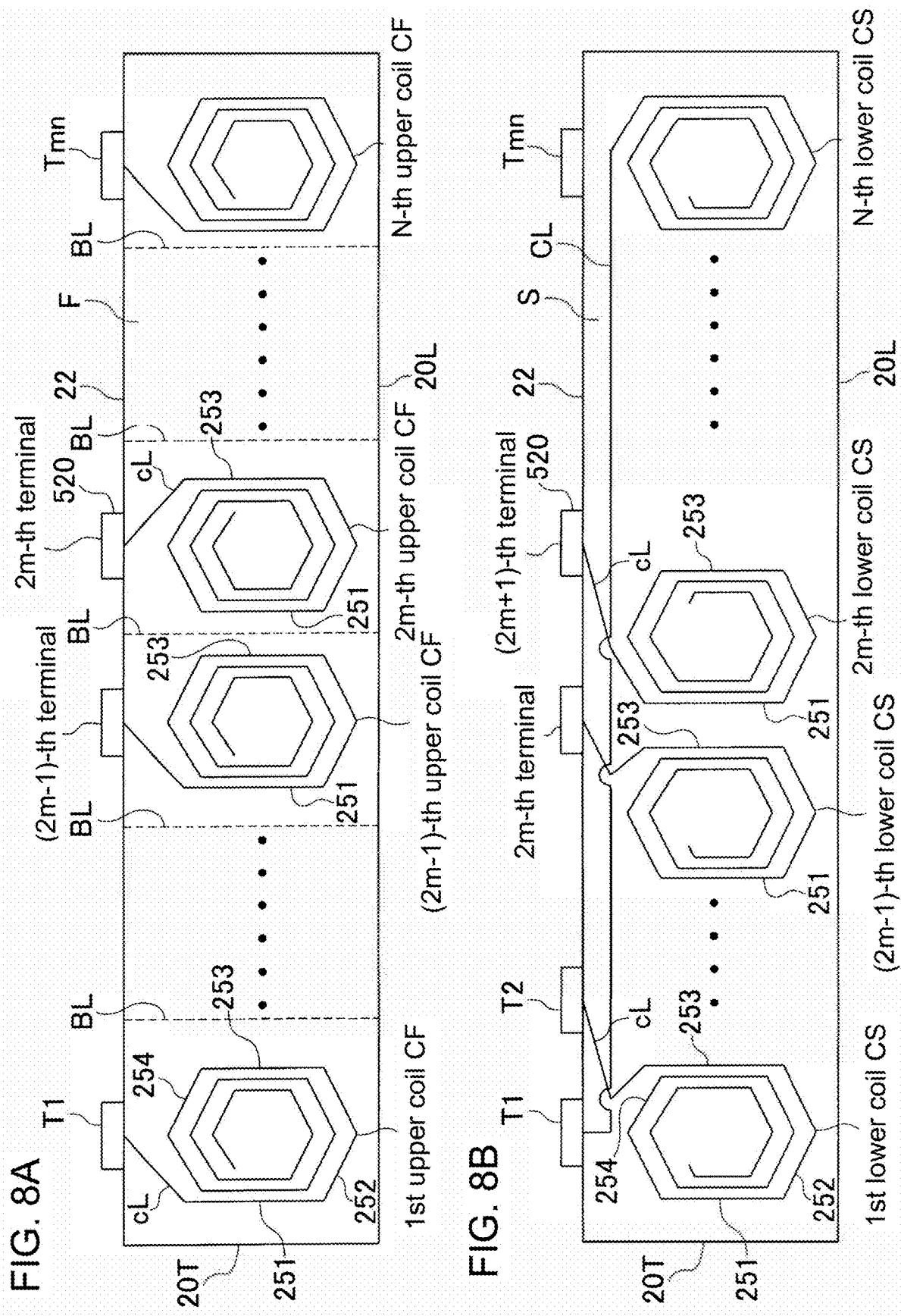

MOTOR COIL SUBSTRATE, MOTOR, AND METHOD FOR MANUFACTURING MOTOR COIL SUBSTRATE

CROSS-REFERENCE TO RELATED APPLICATIONS

The present application is based upon and claims the benefit of priority to Japanese Patent Application No. 2018-170808, filed Sep. 12, 2018, the entire contents of which are incorporated herein by reference.

BACKGROUND OF THE INVENTION

Field of the Invention

The present invention relates to a motor coil substrate surrounding a magnet, a motor, and a method for manufacturing the motor coil substrate.

Description of Background Art

Japanese Patent Application Laid-Open Publication No. 2007-124892 relates to an electric motor, which includes multiple single coils formed of wires. The entire contents of this publication are incorporated herein by reference.

SUMMARY OF THE INVENTION

According to one aspect of the present invention, a coil substrate for a motor includes a flexible substrate, and multiple coils formed on a surface of the flexible substrate. Each of the coils has a wiring having first wiring portions and second wiring portions extending from the first wirings respectively and is formed such that the first wiring portions extend parallel with respect to each other and that the second wiring portions extend not parallel to the first wirings, and the flexible substrate is formed to be formed around a magnet of a motor such that the first wiring portions form an angle that is substantially perpendicular to a rotation direction of the motor.

According to another aspect of the present invention, a motor includes a magnet, and a coil substrate including a flexible substrate, and multiple coils formed on a surface of the flexible substrate. Each of the coils has a wiring having first wiring portions and second wiring portions extending from the first wirings respectively and is formed such that the first wiring portions extend parallel with respect to each other and that the second wiring portions extend not parallel to the first wirings, and the flexible substrate is formed to be formed around a magnet of a motor such that the first wiring portions form an angle that is substantially perpendicular to a rotation direction of the motor.

According to yet another aspect of the present invention, a method for manufacturing a motor coil substrate includes forming, on a flexible substrate, multiple coils such that each of the coils has a central space, folding the flexible substrate at folding lines formed such that a wiring forming a (m+1)-th coil overlaps the central space of a m-th coil, where m is a natural number, and positioning the flexible substrate folded at the folding lines around a magnet of a motor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 7A and 7B illustrate the flexible substrate and the coils (C) on the flexible substrate; and FIGS. 8A and 8B illustrate the flexible substrate and the coils (C) on the flexible substrate.

DETAILED DESCRIPTION OF THE EMBODIMENTS

Figure 1A:
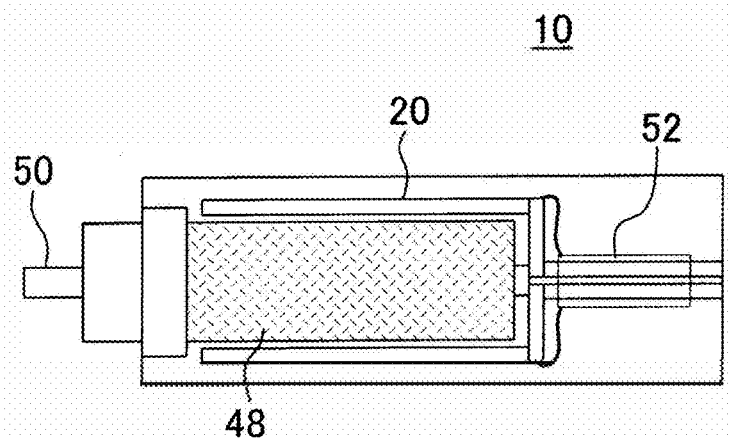
FIG. 1A is a cross-sectional view of a motor of an embodiment.

Embodiments will now be described with reference to the accompanying drawings, wherein like reference numerals designate corresponding or identical elements throughout the various drawings.

First Embodiment

FIG. 1A is a schematic diagram of a motor 10 of an embodiment. An example of the motor 10 is a DC motor. The motor 10 has a magnet 48 and a coil substrate 20 surrounding the magnet 48. The motor can have terminal substrates 520 extending from the coil substrate 20 illustrated in FIG. 1B. The motor 10 can further have a commutator, a brush and a housing (which are not illustrated in the drawings). In the embodiment, the coil substrate 20 rotates. However, it is also possible that the magnet 48 rotates.

Figure 1B:
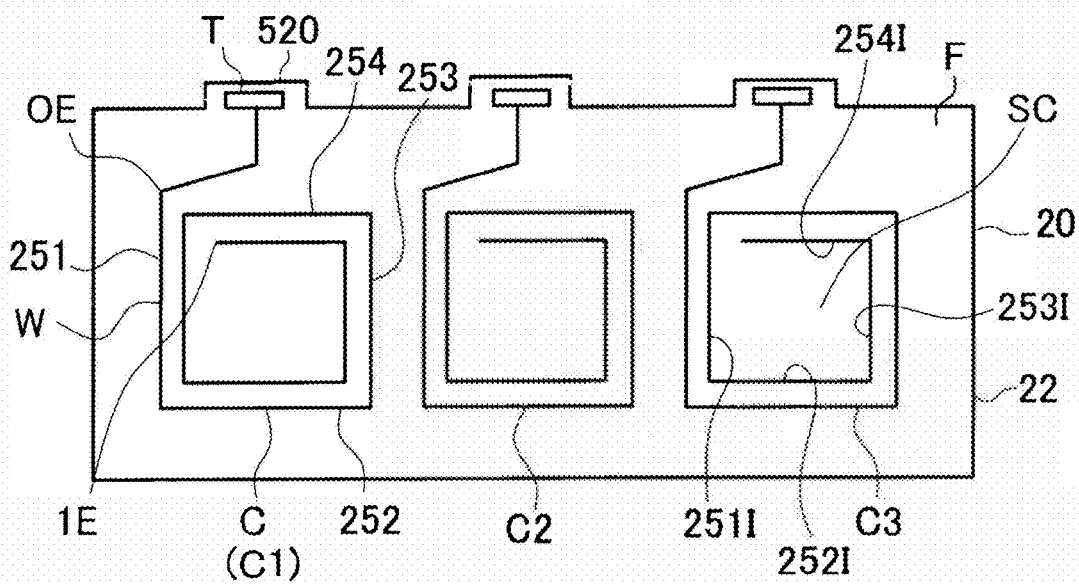
FIG. 1B is a plan view illustrating a coil substrate.

FIG. 1B is a plan view of the coil substrate 20 illustrated in FIG. 1A and the terminal substrates 520. The coil substrate 20 is formed of a flexible substrate 22 and coils (C) formed on the flexible substrate 22. The flexible substrate 22 has a first surface (F) and a second surface (S) on an opposite side with respect to the first surface (F). An example of the flexible substrate 22 is a polyimide insulating substrate.

As illustrated in FIG. 1B, the terminal substrates 520 are directly connected to the coil substrate 20. The terminal substrates 520 and the coil substrate 20 are formed of one flexible substrate 22. Terminals (T) are respectively formed on the terminal substrates 520. The terminals (T) and the coils (C) are simultaneously formed. One coil (C) and another coil (C) are connected to each other via a terminal (T). In the example of FIG. 1B, multiple terminal substrates 520 are provided, and the number of the terminal substrates 520 is 3. The number of the terminal substrates 520 and the number of the coils (C) on the first surface (F) of flexible substrate 22 are the same.

Since the coil substrate 20 and the terminal substrates 520 are formed of the one flexible substrate 22, the structure is simple. Manufacturing is easy.

A commutator is arranged on the terminals (T). The commutator on the terminals (T) is electrically connected to the coils (C). The commutator is formed of a metal having wear resistance with respect to a brush.

An angle detection magnet can be arranged on the terminal substrates 520. The angle detection magnet is arranged at a position corresponding to the coils (C1, C2, C3). The angle detection magnet can have grooves. Due to the grooves, an angle of the motor can be detected with high precision. A surface of the angle detection magnet is divided into 3 or 4 parts by the grooves.

Figure 1C:
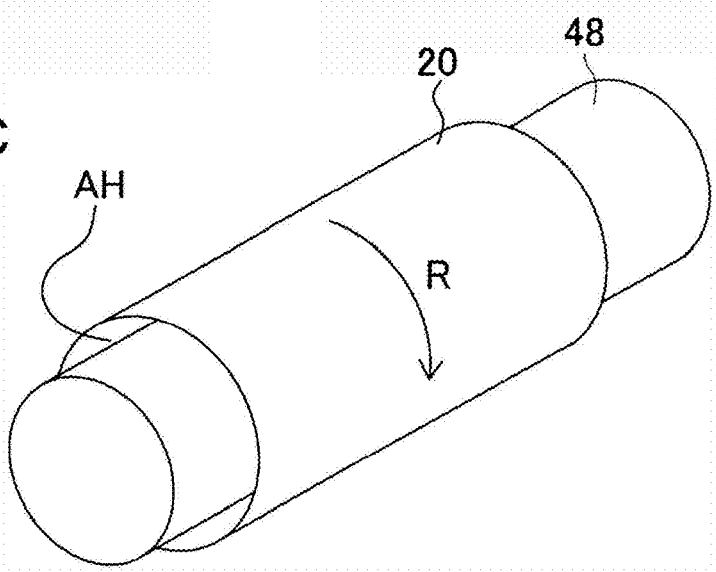
FIG. 1C illustrates a rotation direction of the motor.

FIG. 1C illustrates the motor 10 formed of the magnet 48 and the coil substrate 20. The coil substrate 20 surrounds the magnet 48. The coil substrate 20 is arranged around the magnet 48. A space (cavity) (AH) exists between the magnet 48 and the coil substrate 20. The magnet 48 or the coil substrate 20 rotates.

An arrow (R) in FIG. 1C indicates a rotation direction (R) of the motor 10.

The coil substrate 20 is formed from the flexible substrate 22 having the coils (C). The coil substrate 20 is formed by arranging the flexible substrate 22 having the coils (C) around the magnet 48.

The coils (C) are formed using a technology for a printed wiring board, and wirings forming the coils (C) are formed by plating. Or, the wirings forming the coils (C) are formed by etching a copper foil. The coil substrate 20 can have multiple coils (C). The wirings forming the coils (C) are formed using a semi-additive method or a subtractive method. The multiple coils (C) are formed on the flexible substrate 22. In the example of FIG. 1B, three coils (C1, C2, C3) are formed on the flexible substrate 22. The coils (C) are each formed to have an outer end (OE), an inner end (IE), and a wiring (w) formed between the outer end (OE) and the inner end (IE).

Examples of a winding direction of a coil (C) and a direction of a current flowing through a coil (C) a (first example, a second example, a third example, and a fourth example) are described below.

Figure 5A:
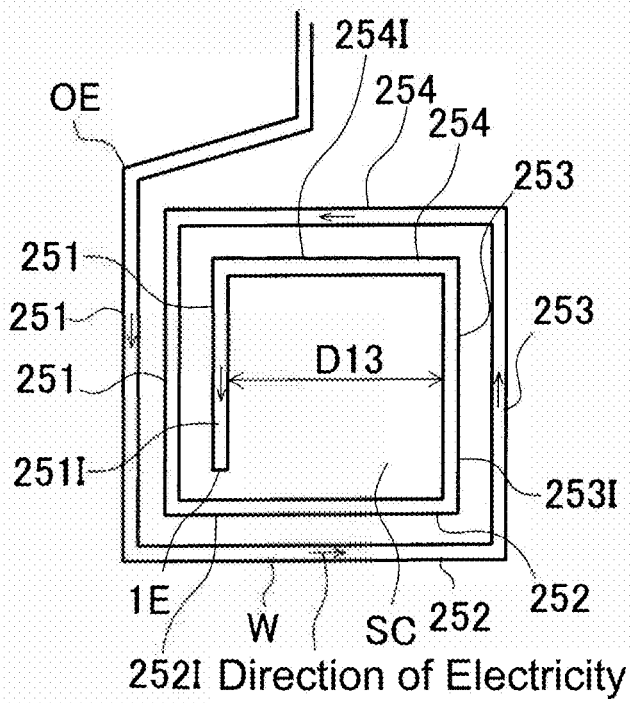
FIG. 5A illustrates a coil (C) of a first example.

FIG. 5A illustrates a coil (C) of the first example A current direction is drawn on the wiring (w) of the coil (C). In the coil (C) of the first example, the wiring (w) forming the coil (C) is formed in a spiral shape from the outer end (OE) to the inner end (IE). The wiring forming the coil (C) of the first example is formed counterclockwise. The current flowing through the coil (C) of the first example flows from the outer end (OE) to the inner end (IE). The current flowing through the coil (C) of the first example flows counterclockwise.

Figure 5B:
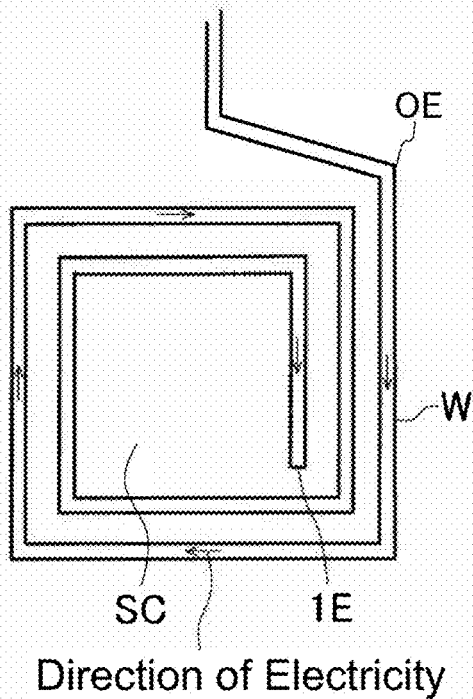
FIG. 5B illustrates a coil (C) of a second example.

FIG. 5B illustrates a coil (C) of the second example. A current direction is drawn on the wiring (w) of the coil (C). In the coil (C) of the second example, the wiring (w) forming the coil (C) is formed in a spiral shape from the outer end (OE) to the inner end (IE). The wiring (w) forming the coil (C) of the second example is formed clockwise. The current flowing through the coil (C) of the second example flows from the outer end (OE) to the inner end (IE). The current flowing through the coil (C) of the second example flows clockwise.

Figure 5C:
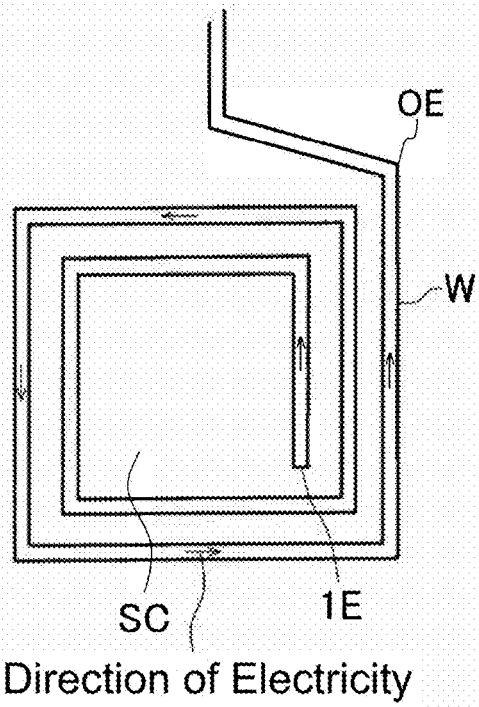
FIG. 5C illustrates a coil (C) of a third example.

FIG. 5C illustrates a coil (C) of the third example. A current direction is drawn on the wiring (w) of the coil (C). In the coil (C) of the third example, the wiring (w) forming the coil (C) is formed in a spiral shape from the inner end (IE) to the outer end (OE). The wiring (w) forming the coil (C) of the third example is formed counterclockwise. The current flowing through the coil (C) of the third example flows from the inner end (TB) to the outer end (OE). The current flowing through the coil (C) of the third example flows counterclockwise.

Figure 5D:
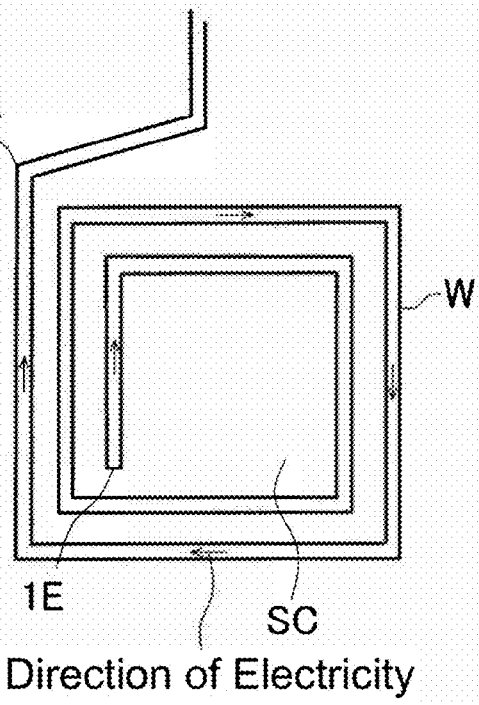
FIG. 5D illustrates a coil (C) of a fourth example.

FIG. 5D illustrates a coil (C) of the fourth example. A current direction is drawn on the wiring (w) of the coil (C). In the coil (C) of the fourth example, the wiring (w) forming the coil (C) is formed in a spiral shape from the inner end (IE) to the outer end (OE). The wiring (w) forming the coil (C) of the fourth example is formed clockwise. The current flowing through the coil (C) of the fourth example flows from the inner end (IE) to the outer end (OE). The current flowing through the coil (C) of the fourth example flows clockwise.

The winding direction of the coil (C) in each of the first example, the second example, the third example, and the fourth example is defined by observing the coil (C) from a position above the first surface (F).

The direction of the current flowing through the coil (C) in each of the first example, the second example, the third example, and the fourth example is defined by observing the coil (C) from a position above the first surface (F).

Figure 2A:
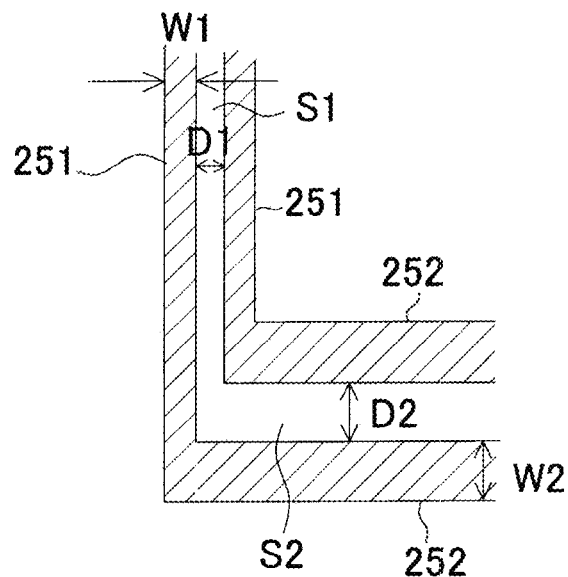
FIG. 2A is an enlarged view of first wirings and second wirings.

The coils (C) of the first example, the second example, the third example, and the fourth example each have multiple first wirings 251 and multiple second wirings 252 that respectively extend from the first wirings 251. The first wirings 251 and the second wirings 252 are illustrated in FIG. 2A. The first wirings 251 are parallel to each other. The second wirings 252 are not parallel to the first wirings 251. When the flexible substrate 22 is arranged around the magnet 48, the first wirings 251 are substantially perpendicular to the rotation direction (R) or the motor. Therefore, directions of currents flowing through the first wirings 251 are substantially perpendicular to the rotation direction (R) of the motor.

Figure 2B:
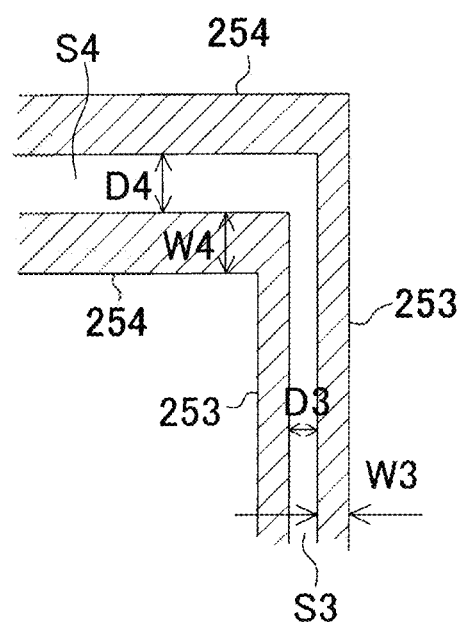
FIG. 2B is an enlarged view of third wirings and fourth wirings.

The coils (C) of the first example, the second example, the third example, and the fourth example each have multiple third wirings 253 and multiple fourth wirings 254 that respectively extend from the third wirings 253. The third wirings 253 and the fourth wirings 254 are illustrated in FIG. 2B. The third wirings 253 are parallel to each other. The third wirings 253 are not parallel to the fourth wirings 254. When the flexible substrate 22 is arranged around the magnet 48, the third wirings 253 are substantially perpendicular to the rotation direction (R) or the motor. Therefore, directions of currents flowing through the third wirings 253 are substantially perpendicular to the rotation direction (R) of the motor.

As illustrated in FIGS. 5A-5D, in the first example, the second example, the third example, and the fourth example, each coil (C) has a central space (SC) at a central portion of the coil (C). It is preferable that there is no wiring (w) in the central space (SC). The central space (SC) is surrounded by an innermost wiring among the wirings forming the coil (C). Among the multiple first wirings 251, an innermost first wiring 251 is an inner side first wiring (2511). Among the multiple second wirings 252, an innermost second wiring 252 is an inner side second wiring (2521). Among the multiple third wirings 253, an innermost third wiring 253 is an inner side third wiring (2531). Among the multiple fourth wirings 254, an innermost fourth wiring 254 is an inner side fourth wiring (2541). The central space is surrounded by the inner side first wiring (2511), the inner side second wiring (2521), the inner side third wiring (2531), and the inner side fourth wiring (2541). The inner side wirings are illustrated in FIGS. 1B and 5A.

The coils (C) illustrated in FIG. 1B each have an approximately rectangular shape. In the example of FIG. 1B, a first wiring 251 extends from the outer end (OE). Then, a second wiring 252 is formed after the first wiring 251, a third wiring 253 is formed after the second wiring 252, a fourth wiring 254 is formed after the third wiring 253, and a first wiring 251 is formed after the fourth wiring 254. In this way, the wirings are formed in the order of a first wiring 251, a second wiring 252, a third wiring 253, and a fourth wiring 254, and a fourth wiring 254 reaches the inner end (IE).

Wirings (perpendicular wirings) that are substantially perpendicular to the rotation direction (R) are longer than wirings other than the perpendicular wirings. A torque of the motor can be increased. In the motor coil substrate of the embodiment, the vertical wirings are the first wirings 251 and the third wirings 253.

When the flexible substrate 22 illustrated in FIG. 1B is arranged around the magnet 48, the first wirings 251 are substantially perpendicular to the rotation direction (R) or the motor. The second wirings 252 are substantially parallel to the rotation direction (R) of the motor.

An enlarged view of the first wirings 251 and the second wirings 252 is illustrated in FIG. 2A. The first wirings 251 each have a width (W1), and the second wirings 252 each have a width (W2). The first wirings 251 have substantially equal widths. The second wirings 252 have substantially equal widths. The width (W1) is smaller than the width (W2). A ratio (W1/W2) of the width (W1) to the width (W2) is larger than 0.7 and smaller than 0.9. For example, the width (W1) is 50 μm or more and 65 μm or less. The width (W2) is 60 μm or more and 85 μm or less.

A space (S1) is formed between adjacent first wirings 251. The space (S1) has a distance (D1). A space (S2) is formed between adjacent second wirings 252. The space (S2) has a distance (D2). The distance (D1) and the distance (D2) are equal to each other. Or, the distance (D1) is smaller than the distance (D2). The distance (D1) and the distance (D2) are preferably equal to each other. When the distance (D1) is smaller than the distance (D2), a ratio (D1/D2) of the distance (D1) to the distance (D2) is larger than 0.85 and smaller than 0.95.

When the flexible substrate 22 illustrated in FIG. 1B is arranged around the magnet 48, the third wirings 253 are substantially perpendicular to the rotation direction (R) or the motor. The fourth wirings 254 are substantially parallel to the rotation direction (R) of the motor.

An enlarged view of the third wirings 253 and the fourth wirings 254 is illustrated in FIG. 2B. The third wirings 253 each have a width (W3), and the fourth wirings 252 each have a width (W4). The third wirings 253 have substantially equal widths. The fourth wirings 254 have substantially equal widths. The width (W3) is smaller than the width (W4). A ratio (W3/W4) of the width (W3) to the width (W4) is larger than 0.7 and smaller than 0.9. For example, the width (W3) is 50 μm or more and 65 μm or less. The width (W4) is 60 pin or more and 85 μm or less.

A space (S3) is formed between adjacent third wirings 253. The space (S3) has a distance (D3). A space (S4) is formed between adjacent fourth wirings 254. The space (S4) has a distance (D4). The distance (D3) and the distance (D4) are equal to each other. Or, the distance (D3) is smaller than the distance (D4). The distance (D3) and the distance (D4) are preferably equal to each other. When the distance (D3) is smaller than the distance (D4), a ratio (D3/D4) of the distance (D3) to the distance (D4) is larger than 0.85 and smaller than 0.95.

The width (W1) and the width (W3) are substantially equal to each other. The width (W2) and the width (W3) are substantially equal to each other. The distance (D1) and the distance (D3) are substantially equal to each other. The distance (D2) and the distance (D4) are substantially equal to each other.

Among the wirings forming a coil (C), wirings other than the first wirings 251 and the third wirings 253 have a width larger than the width (W1) of the first wirings 251.

Among the spaces forming a coil (C), spaces other than the space (S1) and the space (S3) have a distance greater than the distance (D1).

As illustrated in FIGS. 5A-5D, a distance (D13) between the inner side first wiring (2511) and the inner side third wiring (2531) is larger than the distance (D1). A ratio (the distance (D13)/the distance (D1)) of the distance (D13) to the distance (D1) is 200 or more and 400 or less. For example, the distance (D13) is 3 mm or more and 4 mm or less.

The first wirings 251 and the third wirings 253 have substantially equal lengths. Among the wirings forming a coil (C), wirings other than the first wirings 251 and the third wirings 253 have a length shorter than the length of the first wirings 251.

Flexible Substrate for Forming Coil Substrate

As illustrated in FIGS. 7A and 7B, the flexible substrate (insulating substrate) 22 preferably has short sides (20T) and long sides (20L). The coils (C) formed on the flexible substrate 22 each have multiple first wirings 251, multiple second wirings 252, multiple third wirings 253, and multiple fourth wirings 254.

Flexible Substrate of First Example

A flexible substrate 22 of a first example is illustrated in FIG. 7A.

Multiple coils (upper coils) (CF) are formed on the first surface (F) of the flexible substrate 22. The upper coils (CF) are arranged along the long sides (20L) of flexible substrate 22. The upper coils (CF) are arranged in one row from one end to the other end of the flexible substrate 22. The number of the upper coils (CF) is N. N is a natural number. N is 3 or more and 7 or less.

In the flexible substrate 22 of the first example, all the upper coils (CF) are forming of the same coil (C). That is, all the upper coils (CF) are formed of the coil (C) of the first example. Or, all the upper coils (CF) are formed of the coil (C) of the second example. Or, all the upper coils (CF) are formed of the coil (C) of the third example. Or, all the upper coils (CF) are formed of the coil (C) of the fourth example. In this way, all the upper coils (CF) are formed of coils (C) of the same type.

An example of a method for connecting the upper coils (CF) formed on the flexible substrate 22 of the first example is described below. Different upper coils (CF) are connected to each other via terminals (T) and connection wirings (cL). The connection wirings (cL) each include at least one of a conductor circuit on the first surface (F), a conductor circuit on the second surface (S), and a via conductor penetrating the flexible substrate 22. The flexible substrates 22 of the other examples also have similar connection wirings.

The number of the terminal substrates 520 is N, and one terminal (T) is formed on each of the terminal substrates 520. The number of the terminals (T) and the number of the coils (C) are the same.

The m-th upper coil (CFm) and the (m+1)-th upper coil (CFm1) can be connected to each other via the (m+1)-th terminal (Tm1). The m-th upper coil (CFm) is connected to the (m+1)-th terminal (Tm1) via a connection wiring (cL). Then, the (m+1)-th terminal (Tm1) is connected to the (m+1)-th upper coil (CFm1) via a connection wiring (cL).

The N-th upper coil (CFn) and a 1st upper coil (CF1) can be connected to each other via the 1st terminal (T1). The N-th upper coil (CFn) is connected to the 1st terminal (T1) via a connection wiring (cL). Then, the 1st terminal (T1) is connected to the 1st upper coil (CF1) via a connection wiring (cL).

The m-th upper coil (CFm) and the (m+1)-th upper coil (CFm1) can be directly connected to each other by a connection wiring (cL). The number of the terminals (T) or the number of the terminal substrates 520 can be reduced. The number of the terminals (T) or the number of the terminal substrates 520 is 3 or more. The number of the terminals (T) or the number of the terminal substrates 520 is preferably 7 or less.

When the upper coils (CF) are each of the coil (C) of the first example, the inner end of the m-th upper coil (CFm) is connected to a via conductor penetrating the flexible substrate 22. Then, the via conductor is connected to a conductor circuit on the second surface (S). Further, the conductor circuit is connected to the (m+1)-th terminal (Tm1) by a via conductor that penetrates the flexible substrate 22 and connects to the (m+1)-th terminal (Tm1). The (m+1)-th terminal (Tm1) is connected to the (m+1)-th upper coil (CFm1) by a conductor circuit on the first surface (F).

It is preferable that the third wirings 253 of the m-th upper coil (CFm) be adjacent to the first wirings 251 of the (m+1)-th upper coil (CFm1). Also for the flexible substrates 22 of the other examples, it is preferable that the third wirings 253 of the m-th upper coil (CFm) be adjacent to the first wirings 251 of the (m+1)-th upper coil (CFm1).

Connection wirings formed by via conductors and connection wirings formed by conductor circuits on the second surface are not drawn in FIG. 7A.

Flexible Substrate of Second Example

A flexible substrate 22 of a second example is illustrated in FIGS. 7A and 7B.

As illustrated in FIG. 7A, in the flexible substrate 22 of the second example, multiple coils (upper coils) (CF) are formed on the first surface (F). The upper coils (CF) are arranged along the long sides (20L) of the flexible substrate 22. The upper coils (CF) are arranged in one row from one end to the other end of the flexible substrate 22. The number of the upper coils (CF) is N. N is a natural number. N is 3 or more and 7 or less.

As illustrated in FIG. 7B, multiple coils (lower coils) (CS) are formed on the second surface (S) of the flexible substrate 22. The lower coils (CS) are arranged in one row from one end to the other end of the flexible substrate 22. The lower coils (CS) are arranged along the long sides (20L) of the flexible substrate 22. The number of the lower coils (CS) is N. N is a natural number. N is 3 or more and 7 or less.

Combinations of an upper coil (CF) and a lower coil (CS) that face each other via the flexible substrate 22 are described below.

Combination Example 1 (Pair 1)

When the upper coil (CF) is a coil (C) of the first example, the lower coil (CS) is a coil (C) of the third example.

Combination Example 2 (Pair 2)

When the upper coil (CF) is a coil (C) of the second example, the lower coil (CS) is a coil (C) of the fourth example.

Combination Example 3 (Pair 3)

When the upper coil (CF) is a coil (C) of the third example, the lower coil (CS) is a coil (C) of the first example.

Combination Example 4 (Pair 4)

When the upper coil (CF) is a coil (C) of the fourth example, the lower coil (CS) is a coil (C) of the second example.

According to these combinations, the direction of the current flowing through the upper coil (CF) and the direction of the current flowing through the lower coil (CS) are the same. A torque of the motor can be increased.

Coil pairs each including an upper coil (CF) and a lower coil (CS) that face each other via the flexible substrate 22 are formed. In the flexible substrate 22 of the second example, all coil pairs are formed of the same combination. For example, when one coil pair is formed of the pair 1, the other pairs are also formed of the pair 1. The winding directions of the upper coils (CF) are the same. The winding directions of the lower coils (CS) are the same.

The combinations of the upper coils (CF) and the lower coils (CS) illustrated in FIG. 7A are combinations of the pair 1.

An example of a method for connecting the coils (C) formed on the flexible substrate 22 of the second example is described below.

The number of the terminal substrates 520 is N, and one tell (T) is formed on each of the terminal substrates 520. The number of the terminals (T) and the number of the upper coils (CF) are the same. The number of the terminals (T) and the number of the lower coils (CS) are the same. The number of upper coils (CF) and the number of lower coils (CS) are the same. The number of the upper coils (CF) is 3 or more and 7 or less. The number of the lower coils (CS) is 3 or more and 7 or less. The number of the terminals (T) is 3 or more and 7 or less.

The m-th upper coil (CFm) and the (m+1)-th upper coil (CFm1) can be connected to each other via the m-th lower coil (CSm) and the (m+1)-th terminal (Tm1). The m-th upper coil (CFm) is connected to the m-th lower coil (CSm) via a connection wiring (cL). The m-th lower coil (CSm) is connected to the (m+1)-th terminal (Tm1) via a connection wiring (cL). Then, the (m+1)-th terminal (Tm1) is connected to the (m+1)-th upper coil (CFm1) via a connection wiring (cL).

When the upper coils (CF) and the lower coils (CS) are formed in combinations of the pair 1, the inner end (IE) of the m-th upper coil (CFm) is connected to the m-th lower coil (CSm) via a via conductor penetrating the flexible substrate 22. The outer end (OE) of the m-th lower coil (CSm) is connected to the (m+1)-th terminal (Tm1) via a conductor circuit on the second surface (S) and a via conductor penetrating the flexible substrate 22. The (m+1)-th terminal (Tm1) is connected to the (m+1)-th upper coil (CFm1) by a conductor circuit on the first surface (F).

The N-th upper coil (CFn) and the 1st upper coil (CF1) can be connected to each other via the N-th lower coil (CSn) and the 1st terminal (T1). The N-th upper coil (CFn) is connected to the N-th lower coil (CSn) via a connection wiring (cL). The N-th lower coil (CSn) is connected to the 1st terminal (T1) via a connection wiring (cL). Then, the 1st terminal (T1) is connected to the 1st upper coil (CF1) via a connection wiring (cL).

The m-th lower coil (CSm) and the (m+1)-th lower coil (CSm1) can be connected to each other via the (m+1)-th terminal (Tm1) and the (m+1)-th upper coil (CFm1). The m-th lower coil (CSm) is connected to the (m+1)-th terminal (Tm1) via a connection wiring (cL). The (m+1)-th terminal (Tm1) is connected to the (m+1)-th upper coil (CFm1) via a connection wiring (cL). Then, the (m+1)-th upper coil (CFm1) is connected to the (m+1)-th lower coil (CSm1) via a connection wiring (cL).

When the upper coils (CF) and the lower coils (CS) are formed in combinations of the pair 1, the outer end of the m-th lower coil (CSm) is connected to the (m+1)-th terminal (Tm1) by a conductor circuit on the second surface (S) and a via conductor penetrating the flexible substrate 22. The (m+1)-th terminal (Tm1) is connected to the outer end of the (m+1)-th upper coil (CFm1) by a conductor circuit on the first surface (F). Then, the inner end of the (m+1)-th upper coil (CFm1) is connected to the (m+1)-th lower coil (CSm1) by a via conductor penetrating the flexible substrate 22.

The N-th lower coil (CSn) and the 1st lower coil (CS1) can be connected to each other via the 1st terminal (T1) and the 1st upper coil (CF1). The N-th lower coil (CSn) is connected to the 1st terminal (T1) via a connection wiring (cL). The 1st terminal (T1) is connected to the 1st upper coil (CF1) via a connection wiring (cL). Then, the 1st upper coil (CF1) is connected to the 1st lower coil (CS1) via a connection wiring (cL).

The m-th lower coil (CSm) and the (m+1)-th lower coil (CFm1) can be directly connected to each other by a connection wiring (cL). The number of the terminals (T) or the number of the terminal substrates 520 can be reduced. The number of the terminals (T) or the number of the terminal substrates 520 is 3 or more.

Flexible Substrate of Third Example

A flexible substrate 22 of a third example is illustrated in FIG. 8A.

As illustrated in FIG. 8A, multiple coils (upper coils) (CF) are formed on the first surface (F) of the flexible substrate 22. The upper coils (CF) are arranged along the long sides (20L) of the flexible substrate 22. The upper coils (CF) are arranged in one row from one end to the other end of the flexible substrate 22. The number of the upper coils (CF) is N. N is a natural number. N is 3 or more and 7 or less.

The winding direction of the (2m−1)-th upper coil (CF) and the winding direction of the 2m-th upper coil (CF) are different from each other. Examples of combinations are described below. m is a natural number.

First Example of the (2m−1)-th Upper Coil (CF) and the 2m-th Upper Coil (CF)

The (2m−1)-th upper coil (CF) is a coil (C) of the first example, and the 2m-th upper coil (CF) is a coil (C) of the second example.

Second Example of the (2m−1)-th Upper Coil (CF) and the 2m-th Upper Coil (CF)

The (2m−1)-th upper coil (CF) is a coil (C) of the second example, and the 2m-th upper coil (CF) is a coil (C) of the first example.

Third Example of the (2m−1)-th Upper Coil (CF) and the 2m-th Upper Coil (CF)

The (2m−1)-th upper coil (CF) is a coil (C) of the third example, and the 2m-th upper coil (CF) is a coil (C) of the fourth example.

Fourth Example of the (2m−1)-th Upper Coil (CF) and the 2m-th Upper Coil (CF)

The (2m−1)-th upper coil (CF) is a coil (C) of the fourth example, and the 2m-th upper coil (CF) is a coil (C) of the third example.

In the flexible substrate 22 of the third example, the winding directions of adjacent coils (C) are opposite with respect to each other. The winding direction of the (2m−1)-th upper coil (CF) and the winding direction of the (2m+1)-th upper coil (CF) are the same. For example, when the (2m−1)-th upper coil (CF) is a coil (C) of the first example, the (2m+1)-th upper coil (CF) is also a coil (C) of the first example.

A method for connecting the upper coils (CF) formed on the flexible substrate 22 of the third example is the same as the method for connecting the upper coils (CF) formed on the flexible substrate 22 of the first example. Therefore, the m-th upper coil (CFm) and the (m+1)-th upper coil (CFm1) are connected to the (m+1)-th terminal (Tm1) by connection wirings. The N-th upper coil (CFn) and the 1st upper coil (CF1) are connected to the first terminal (T1) by connection wirings.

Flexible Substrate of Fourth Example

A flexible substrate 22 of a fourth example is illustrated in FIGS. 8A and 8B.

As illustrated in FIG. 8A, in the flexible substrate 22 of the fourth example, multiple coils (upper coils) (CF) are formed on the first surface (F). The upper coils (CF) are arranged along the long sides (20L) of the flexible substrate 22. The upper coils (CF) are arranged in one row from one end to the other end of the flexible substrate 22. The number of the upper coils (CF) is N. N is a natural number. N is 3 or more and 11 or less.

As illustrated in FIG. 8B, multiple coils (lower coils) (CS) are formed on the second surface (S) of the flexible substrate 22. The lower coils (CS) are arranged in one row from one end to the other end of the flexible substrate 22. The lower coils (CS) are arranged along the long sides (20L) of the flexible substrate 22. The number of the lower coils (CS) is N. N is a natural number. N is 3 or more and 11 or less.

Similar to the flexible substrate 22 of the second example, the flexible substrate 22 of the fourth example has coil pairs.

The coil pairs formed on the flexible substrate 22 of the second example are of one type. That is, the coil pairs formed on the flexible substrate 22 of the second example are of one of the combination example 1, the combination example 2, the combination example 3, and the combination example 4. In contrast, in the flexible substrate 22 of the fourth example, adjacent coil pairs are formed in different combinations.

Examples of the (2m−1)-th coil pair combination and the 2m-th coil pair combination are described as follows. m is a natural number.

First Example of the (2m−1)-th Coil Pair and the 2m-th Coil Pair

The (2m−1)-th coil pair is of the pair 1 and the 2m-th coil pair is of the pair 2.

Second Example of the (2m−1)-th Coil Pair and the 2m-th Coil Pair

The (2m−1)-th coil pair is of the pair 2 and the 2m-th coil pair is of the pair 1.

Third Example of the (2m−1)-th Coil Pair and the 2m-th Coil Pair

The (2m−1)-th coil pair is of the pair 3 and the 2m-th coil pair is of the pair 4.

Fourth Example of the (2m−1)-th Coil Pair and the 2m-th Coil Pair

The (2m−1)-th coil pair is of the pair 4 and the 2m-th coil pair is of the pair 3.

In the flexible substrate 22 of the fourth example, the winding directions of adjacent coils (C) are opposite with respect to each other. The (2m−1)-th coil pair combination and the (2m+1)-th coil pair combination are the same. For example, when the 1st coil pair is of the pair 1, the 3rd coil pair is also of the pair 1.

A method for connecting the coils (C) formed on the flexible substrate 22 of the fourth example is the same as the method for connecting the coils (C) formed on the flexible substrate 22 of the second example.

The (2m−1)-th upper coil (CF) and the 2m-th upper coil (CF) are connected to each other via the (2m−1)-th lower coil (CS), the 2m-th terminal (T), and a connection wiring (cL). The 2m-th upper coil (CF) and the (2m+1)-th upper coil (CF) are connected to each other via the 2m-th lower coil (CS), the (2m+1)-th terminal (T), and a connection wiring (cL). The N-th upper coil (CFn) and the 1st upper coil (CF1) are connected to each other via the N-th lower coil (CSn), the 1st terminal (T1), and a connection wiring (cL).

The (2m−1)-th lower coil (CS) and the 2m-th lower coil (CS) are connected to each other via the 2m-th upper coil (CF), the 2m-th terminal (T), and a connection wiring (cL). The 2m-th lower coil (CS) and the (2m+1)-th lower coil (CS) are connected to each other via the (2m+1)-th upper coil (CF), the (2m+1)-th terminal (T), and a connection wiring (cL). The N-th lower coil (CSn) and the 1st lower coil (CS1) are connected to each other via the 1st upper coil (CF1), the 1st terminal (T1), and a connection wiring (cL).

In the flexible substrate 22 of the second example and the flexible substrate 22 of the fourth example, the upper coils (CF) respectively face the lower coils (CS) via the flexible substrate 22. When the lower coils (CS) are projected on the first surface (F) with light perpendicular to the first surface (F), the upper coils (CF) respectively substantially overlap with the lower coils (CS). The first wirings 251 of the upper coils (CF) respectively face the first wirings 251 of the lower coils (CS) via the flexible substrate 22. The third wirings 253 of the upper coils (CF) respectively face the third wirings 253 of the lower coils (CS) via the flexible substrate 22. The second wirings 252 of the upper coils (CF) can respectively face the second wirings 252 of the lower coils (CS) via the flexible substrate 22. The fourth wirings 254 of the upper coils (CF) can respectively face the fourth wirings 254 of the lower coils (CS) via the flexible substrate 22. Fifth wirings 255 of the upper coils (CF) can respectively face fifth wirings 255 of the lower coils (CS) via the flexible substrate 22. Sixth wirings 256 of the upper coils (CF) can respectively face sixth wirings 256 of the lower coils (CS) via the flexible substrate 22.

Coil Substrate Using the Flexible Substrate of the First Example

The flexible substrate 22 of the first example is wound around a cavity. A cylindrical flexible substrate 22 is obtained. The cylindrical flexible substrate 22 is arranged around the magnet 48. In this way, a motor coil substrate 20 is formed by arranging the flexible substrate 22 of the first example around the magnet 48. The flexible substrate 22 of the first example is wound around the magnet 48 such that the first wirings 251 and the third wirings 253 are perpendicular to the rotation direction (R) of the motor.

The magnet 48 and the first surface (F) of the flexible substrate 22 face each other. Or, the magnet 48 and the second surface (S) of the flexible substrate 22 face each other.

When the flexible substrate 22 of the first example is arranged around the magnet 48, the terminal substrates 520 are preferably arranged around the magnet 48 together with the flexible substrate 22.

Coil Substrate Using the Flexible Substrate of the Second Example

The flexible substrate 22 of the second example is wound around a cavity. A cylindrical flexible substrate 22 is obtained. The cylindrical flexible substrate 22 is arranged around the magnet 48. In this way, a motor coil substrate 20 is formed by arranging the flexible substrate 22 of the second example around the magnet 48. The flexible substrate 22 of the second example is wound around the magnet 48 such that the first wirings 251 and the third wirings 253 are perpendicular to the rotation direction (R) of the motor.

The magnet 48 and the first surface (F) of the flexible substrate 22 face each other. Or, the magnet 48 and the second surface (S) of the flexible substrate 22 face each other.

When the flexible substrate 22 of the second example is arranged around the magnet 48, the terminal substrates 520 are preferably arranged around the magnet 48 together with the flexible substrate 22.

Coil Substrate Using the Flexible Substrate of the Third Example

A method for producing a coil substrate 20 is described next using FIGS. 3A, 3B, 4A-4C, 8A and 8B.

The flexible substrate 22 of the third example is folded by folding the flexible substrate 22 of the third example along the folding lines (BL) illustrated in FIG. 8A. The flexible substrate 22 of the third example is folded such that the first surfaces (F) and the second surfaces (S) of the flexible substrate 22 alternately face each other.

The flexible substrate is folded such that the first surfaces (F) face each other. Subsequently, the flexible substrate is folded such that the second surfaces (S) face each other. Subsequently, the flexible substrate is folded such that the first surfaces (F) face each other. Subsequently, the flexible substrate is folded such that the second surfaces (S) face each other. As a result, the first surfaces (F) and the second surfaces (S) alternately face each other.

The folded flexible substrate 22 of the third example is wound around a cavity. A cylindrical flexible substrate 22 is obtained. The cylindrical flexible substrate 22 is arranged around the magnet 48. In this way, a motor coil substrate 20 is formed by arranging the folded flexible substrate 22 of the third example around the magnet 48.

The folded flexible substrate 22 of the third example is wound around the magnet 48 such that the first wirings 251 and the third wirings 253 are perpendicular to the rotation direction (R) of the motor.

When the folded flexible substrate 22 of the third example is arranged around the magnet 48, the terminal substrates 520 are arranged around the magnet 48 together with the flexible substrate 22.

An example of folding the flexible substrate 22 of the third example is described using FIGS. 3A, 3B and 4A-4C.

Figure 3A:
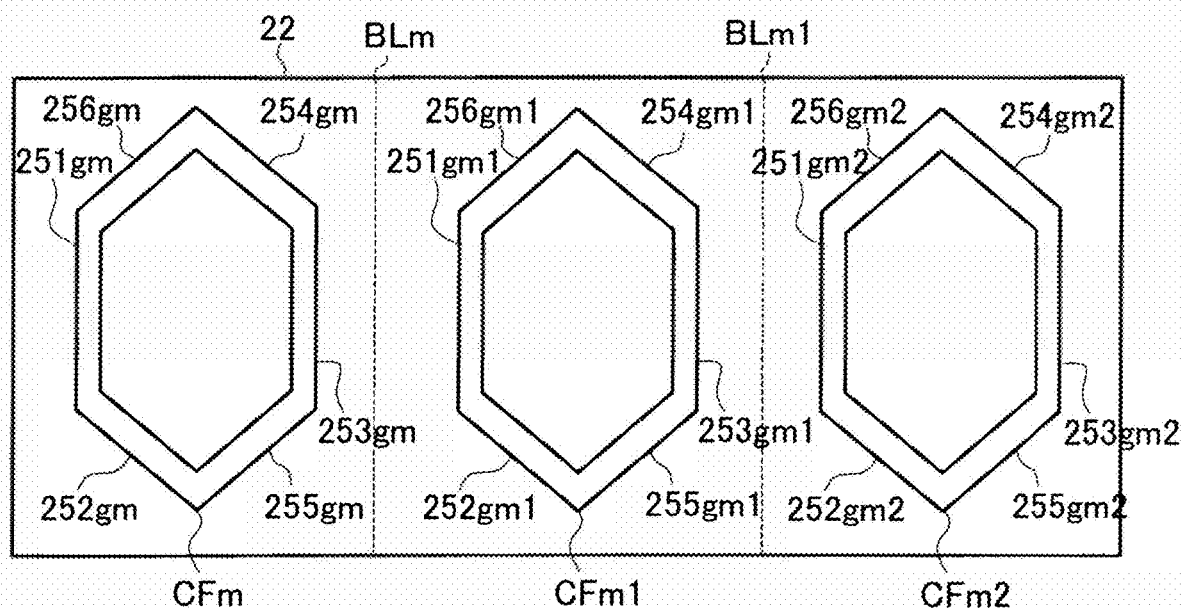
FIGS. 3A and 3B illustrate upper coils and lower coils formed by wiring groups.

FIG. 3A illustrates the flexible substrate 22 of the third example. The upper coils (CF) are illustrated with partial omission. In FIG. 3A, the m-th upper coil (CFm), the (m+1)-th upper coil (CFm1), and the (m+2)-th upper coil (CFm2) are drawn.

Figure 6A:
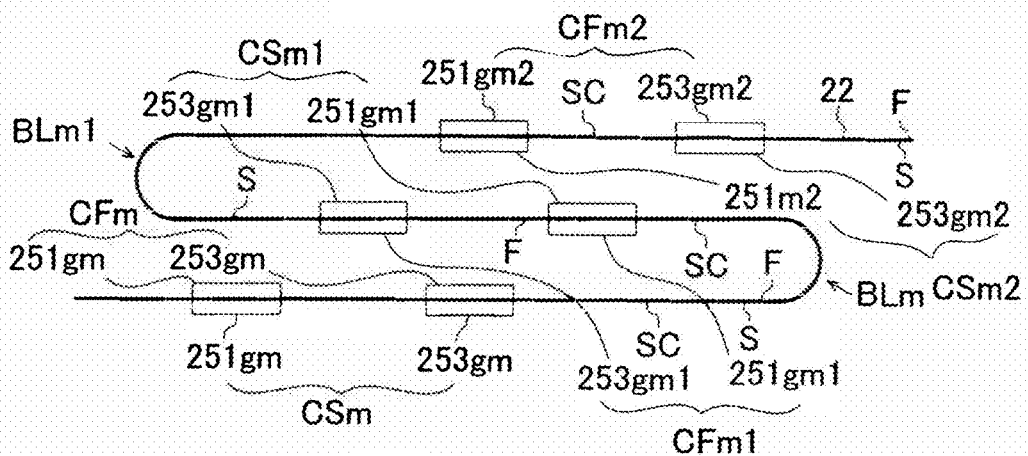
FIG. 6A is a schematic diagram illustrating a folded flexible substrate.

In FIG. 6A, the wirings forming the upper coils (CF) are drawn with partial omission.

Multiple first wirings 251 than a first wiring group (251g). In FIG. 6A, the first wirings 251 are not individually drawn. The first wiring groups (251g) are drawn.

Multiple second wirings 252 form a second wiring group (252g). In FIG. 6A, the second wirings 252 are not individually drawn. The second wiring groups (252g) are drawn.

Multiple third wirings 253 form a third wiring group (253g). In FIG. 6A, the third wirings 253 are not individually drawn. The third wiring groups (253g) are drawn.

Multiple fourth wirings 254 form a fourth wiring group (254g). In FIG. 6A, the fourth wirings 254 are not individually drawn. The fourth wiring groups (254g) are drawn.

Multiple fifth wirings 255 form a fifth wiring group (255g). In FIG. 6A, the fifth wirings 255 are not individually drawn. The fifth wiring groups (255g) are drawn.

Multiple sixth wirings 256 form a sixth wiring group (256g). In FIG. 6A, the sixth wirings 256 are not individually drawn. The sixth wiring groups (256g) are drawn.

The first wiring group (251g) of the (m+1)-th upper coil (CFm1) is next to the third wiring group (253g) of the m-th upper coil (CFm).

The first wiring group (251g) forming the m-th upper coil (CFm) is the m-th first wiring group (251gm), the first wiring group (251g) forming the (m+1)-th upper coil (CFm1) is the (m+1)-th first wiring group (251gm1), and the first wiring group (251g) forming the (m+2)-th upper coil (CFm2) is the (m+2)-th first wiring group (251gm2).

The second wiring group (252g) forming the m-th upper coil (CFm) is the m-th second wiring group (252gm), the second wiring group (252g) forming the (m+1)-th upper coil (CFm1) is the (m+1)-th second wiring group (252gm1), and the second wiring group (252g) forming the (m+2)-th upper coil (CFm2) is the (m+2)-th second wiring group (252gm2).

The third wiring group (253g) forming the m-th upper coil (CFm) is the m-th third wiring group (253gm), the third wiring group (253g) forming the (m+1)-th upper coil (CFm1) is the (m+1)-th third wiring group (253gm1), and the third wiring group (253g) forming the (m+2)-th upper coil (CFm2) is the (m+2)-th third wiring group (253gm2).

The fourth wiring group (254g) forming the m-th upper coil (CFm) is the m-th fourth wiring group (254gm), the fourth wiring group (254g) forming the (m+1)-th upper coil (CFm1) is the (m+1)-th fourth wiring group (254gm1), and the fourth wiring group (254g) forming the (m+2)-th upper coil (CFm2) is the (m+2)-th fourth wiring group (254gm2).

The fifth wiring group (255g) forming the m-th upper coil (CFm) is the m-th fifth wiring group (255gm), the fifth wiring group (255g) forming the (m+1)-th upper coil (CFm1) is the (m+1)-th fifth wiring group (255gm1), and the fifth wiring group (255g) forming the (m+2)-th upper coil (CFm2) is the (m+2)-th fifth wiring group (255gm2).

The sixth wiring group (256g) forming the m-th upper coil (CFm) is the m-th sixth wiring group (256gm), the sixth wiring group (256g) forming the (m+1)-th upper coil (CFm1) is the (m+1)-th sixth wiring group (256gm1), and the sixth wiring group (256g) forming the (m+2)-th upper coil (CFm2) is an (m+2)-th sixth wiring group (256gm2).

The coils of FIG. 3A each have an approximately hexagonal shape. The upper coils (CF) may further each have seventh wirings and eighth wirings. In this case, the upper coils (CF) each have an approximately octagonal shape.

Figure 3B:
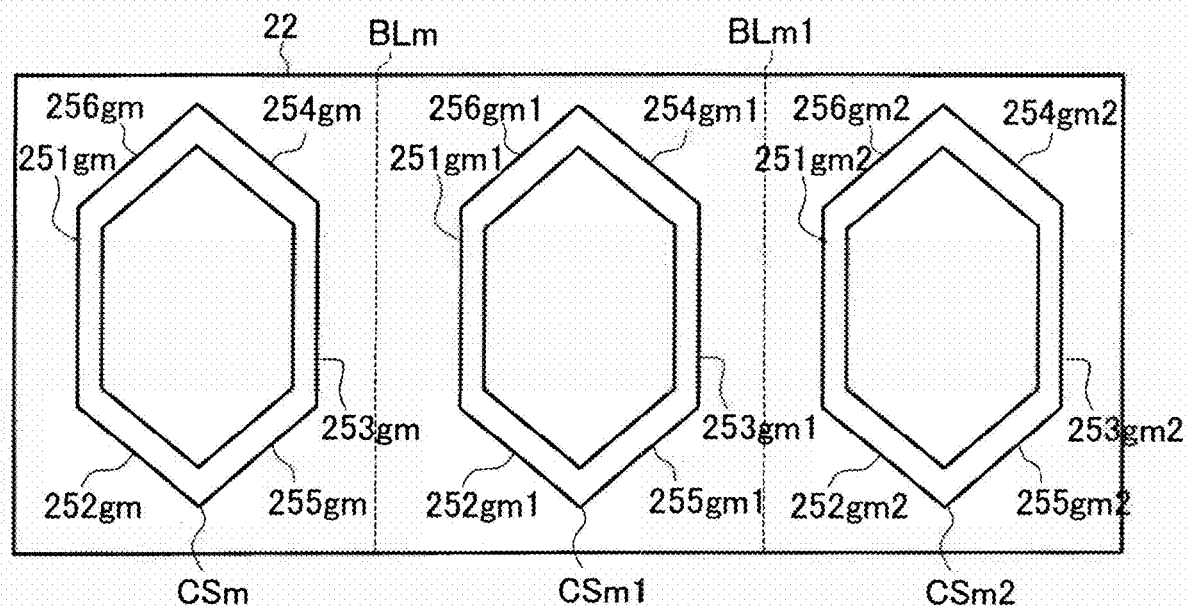
Figure 4A:
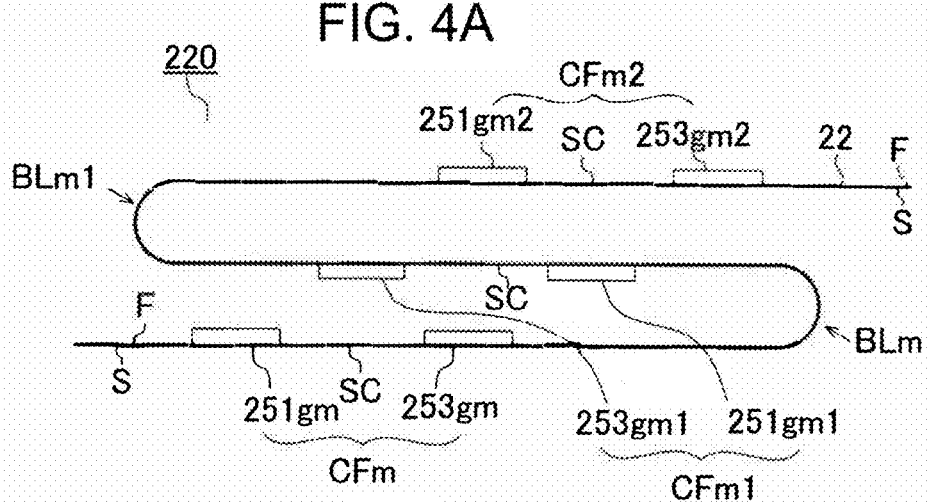
FIG. 4A is a schematic diagram illustrating a folded flexible substrate.
Figure 4B:
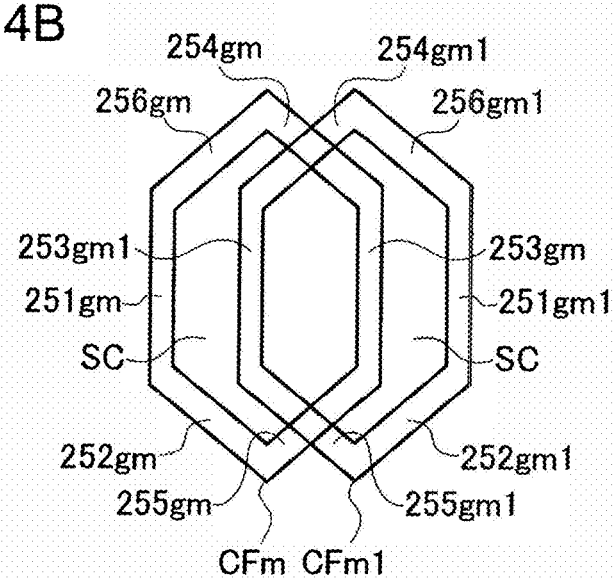
FIGS. 4B and 4C are explanatory diagrams illustrating overlapping of the coils.
Figure 4C:
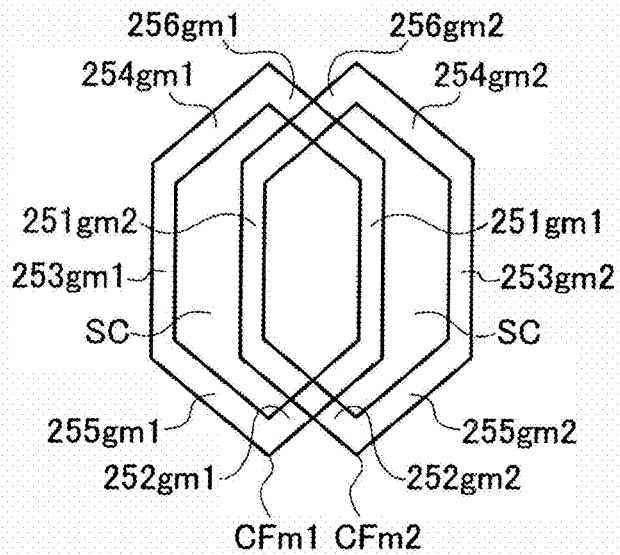

An example of folding the flexible substrate 22 of the third example is described next using FIGS. 3A, 3B, 4A-4C, 7A and 7B. FIG. 3A illustrates folding lines (BL). FIGS. 4A-4C illustrate a cross section of a folded substrate 220 and overlapping of the coils. FIGS. 3A and 3B illustrate the substrate 22 having the coils (C) formed by the wiring groups.

In FIG. 4A, the flexible substrate 22, the first wiring group (251gm) of the m-th upper coil (CFm), the third wiring group (253gm) of the m-th upper coil (CFm), the first wiring group (251gm1) of the (m+1)-th upper coil (CFm1), the third wiring group (253gm1) of the (m+1)-th upper coil (CFm1), the first wiring group (251gm2) of the (m+2)-th upper coil (CFm2), and the third wiring group (253gm2) of the (m+2)-th upper coil (CFm2) are drawn.

The flexible substrate 22 of the third example is folded along the folding lines (BL) illustrated in FIG. 3A. There is one folding line (BL) between adjacent upper coils (CF). Therefore, the m-th folding line (BLm) exits between the m-th upper coil (CFm) and the (m+1)-th upper coil (CFm1). The (m+1)-th folding line (BLm1) exists between the (m+1)-th upper coil (CFm1) and the (m+2)-th upper coil (CFm2).

As illustrated in FIG. 4A, the flexible substrate 22 of the third example is folded along the folding line (BLm). In this case, the flexible substrate 22 of the third example is folded such that the first surface (F) faces the first surface (F).

As illustrated in FIGS. 4A and 4B, the wirings forming the (m+1)-th upper coil (CFm1) are laminated on the central space of the m-th upper coil (CFm). A space factor of the coils can be increased. Among the wirings forming the upper coil (CF), wirings substantially perpendicular to the rotation direction (R) of the motor are laminated on the central space. By laminating the wirings perpendicular to the rotation direction (R) of the motor on the central space, the torque of the motor can be increased.

The wiring groups forming the (m+1)-th upper coil (CFm1) are laminated on the central space of the m-th upper coil (CFm). Among the wirings forming the upper coil (CF), wiring groups substantially perpendicular to the rotation direction (R) of the motor are laminated on the central space. By laminating the wiring groups perpendicular to the rotation direction (R) of the motor on the central space, the torque of the motor can be increased.

Among the wirings forming the next upper coil, wirings substantially perpendicular to the rotation direction (R) of the motor are laminated on the central space of the previous upper coil. The wirings laminated on the central space are the first wirings 251 or the third wirings 253. The wirings laminated on the central space are of the first wiring group (251g) or the third wiring group (253g).

The flexible substrate 22 of the third example is folded such that the third wiring group (253g1) of the (m+1)-th upper coil (CFm1) is positioned on the central space of the m-th upper coil (CFm). The third wiring group (253g1) of the (m+1)-th upper coil (CFm1) is laminated on the central space of the m-th upper coil (CFm).

As illustrated in FIG. 4A, the flexible substrate 22 of the third example is folded along the folding line (BLm1). As illustrated in FIGS. 4A and 4C, the wirings forming the (m+2)-th upper coil (CFm2) are laminated on the central space of the (m+1)-th upper coil (CFm1). A space factor of the coils can be increased. Among the wirings forming the upper coil (CF), wirings substantially perpendicular to the rotation direction (R) of the motor are laminated on the central space. By laminating the wirings perpendicular to the rotation direction (R) of the motor on the central space, the torque of the motor can be increased.

The wiring groups forming the (m+2)-th upper coil (CFm2) are laminated on the central space of the (m+1)-th upper coil (CFm1). A space factor of the coils can be increased. When the motor coil substrate is manufactured, among the wirings forming the (m+2)-th upper coil (CF), wiring groups perpendicular to the rotation direction (R) of the motor is laminated on the central space. Thereby, the torque of the motor can be increased.

The flexible substrate 22 of the third example is folded such that the first wiring group (251g2) of the (m+2)-th upper coil (CFm2) is positioned on the central space of the (m+1)-th upper coil (CFm1). The first wiring group (251g2) of the (m+2)-th upper coil (CFm1]2) is laminated on the central space of the (m+1)-th upper coil (CFm1).

A coil is laminated on a previous coil such that the first wirings 251 are positioned on the central space of the previous coil. A next coil is laminated on the coil laminated on the previous coil such that the third wirings 253 are positioned on the central space of the coil laminated on the previous coil.

In this way, the first wirings 251 and the third wirings 253 are alternately laminated on the central space of the previous coil.

A coil is laminated on a previous coil such that the first wiring group (251g) is positioned on the central space of the previous coil. A next coil is laminated on the coil laminated on the previous coil such that the third wiring group (253g) is positioned on the central space of the coil laminated on the previous coil.

In this way, the first wiring group (251g) and the third wiring group (253g) are alternately laminated on the central space of the previous coil.

The flexible substrate of the third example is folded such that wirings substantially perpendicular to the rotation direction (R) of the motor are laminated on the central space of the previous upper coil. The flexible substrate of the third example is folded such that wiring groups substantially perpendicular to the rotation direction (R) of the motor are laminated on the central space of the previous upper coil. After that, the folded flexible substrate of the third example is wound around the magnet 48. A coil substrate is obtained from the flexible substrate of the third example. The first wirings 251 of the upper coils (CF) are substantially perpendicular to the rotation direction (R) of the motor. The third wirings 253 of the upper coils (CF) are substantially perpendicular to the rotation direction (R) of the motor.

Coil Substrate Using the Flexible Substrate of the Fourth Example

A method for folding the flexible substrate 22 of the fourth example is substantially the same as the method for folding the flexible substrate 22 of the third example.

FIG. 3A illustrates the first surface (F) of the flexible substrate 22 of the fourth example. The upper coils (CF) are drawn with partial omission. In FIG. 3A, the m-th upper coil (CFm), the (m+1)-th upper coil (CFm1), and the (m+2)-th upper coil (CFm2) are drawn. The upper coils (CF) of FIG. 3A are drawn with wiring groups.

FIG. 3B illustrates the second surface (S) of the flexible substrate 22 of the fourth example. The lower coils (CS) are drawn with partial omission. In FIG. 3B, the m-th lower coil (CSm), the (m+1)-th lower coil (CSm1) and the (m+2)-th lower coil (CSm2) are drawn. The lower coils (CS) of FIG. 3B are drawn with wiring groups.

The folded flexible substrate 22 of the fourth example is wound around a cavity. A cylindrical flexible substrate 22 is obtained. The cylindrical flexible substrate 22 is arranged around the magnet 48. In this way, a motor coil substrate 20 is formed by arranging the folded flexible substrate 22 of the fourth example around the magnet 48.

The folded flexible substrate 22 of the fourth example is wound around the magnet 48 such that the first wirings 251 and the third wirings 253 are perpendicular to the rotation direction (R) of the motor.

When the folded flexible substrate 22 of the fourth example is arranged around the magnet 48, the terminal substrates 520 are preferably arranged around the magnet 48 together with the flexible substrate 22.

Figure 6B:
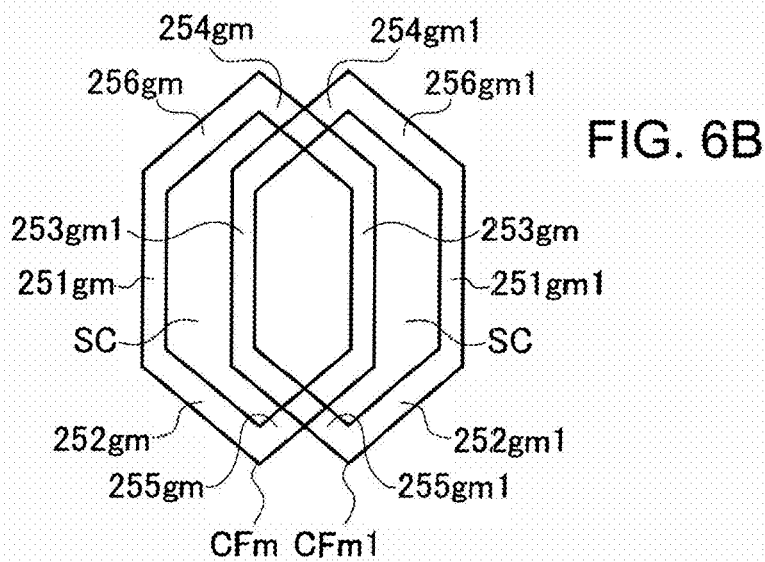
FIGS. 6B and 6C are explanatory diagrams illustrating overlapping of the coils.
Figure 6C:
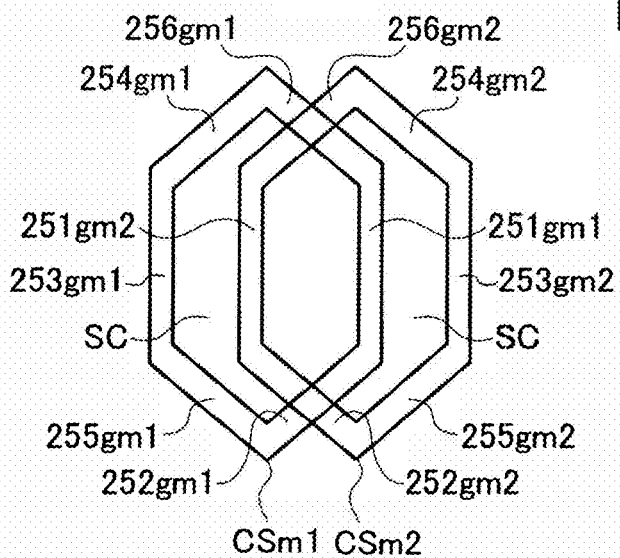

An example of folding the flexible substrate 22 of the fourth example is described next using FIGS. 3A, 3B, 6A-6C, 7A and 7B. FIG. 3A illustrates folding lines (BL). FIGS. 6A-6C illustrate a cross section of a folded substrate 220 and overlapping of the coils. FIGS. 6A and 6B illustrate the substrate 22 having the coils (C) formed by the wiring groups.

The flexible substrate 22 of the fourth example is folded along the folding lines (BL) illustrated in FIGS. 3A and 6A. There is one folding line (BL) between adjacent upper coils (CF). There is one folding line (BL) between adjacent lower coils (CS). Therefore, the m-th folding line (BLm) exits between the m-th upper coil (CFm) and the (m+1)-th upper coil (CFm1). Therefore, the m-th folding line (BLm) exits between the m-th lower coil (CSm) and the (m+1)-th lower coil (CSm1). The (m+1)-th folding line (BLm1) exists between the (m+1)-th upper coil (CFm1) and the (m+2)-th upper coil (CFm2). The (m+1)-th folding line (BLm1) exists between the (m+1)-th lower coil (CSm1) and the (m+2)-th lower coil (CSm2).

An example of folding the flexible substrate of the fourth example is illustrated in FIG. 6A. FIG. 6A is a schematic diagram, and not all the wiring groups are drawn. FIG. 6A, the flexible substrate 22, the first wiring group (251gm) of the m-th upper coil (CFm), the third wiring group (253gm) of the m-th upper coil (CFm), the first wiring group (251gm) of the m-th lower coil (CSm), the third wiring group (253gm) of the m-th lower coil (CSm), the first wiring group (251gm1) of the (m+1)-th upper coil (CFm1), the third wiring group (253gm1) of the (m+1)-th upper coil (CFm1), the first wiring group (251gm1) of the (m+1)-th lower coil (CSm1), the third wiring group (253gm1) of the (m+1)-th lower coil (CSm1), the first wiring group (251gm2) of the (m+2)-th upper coil (CFm2), the third wiring group (253gm2) of the (m+2)-th upper coil (CFm2), the first wiring group (251gm2) of the (m+2)-th lower coil (CSm2), and the third wiring group (253gm2) of the (m+2)-th lower coil (CSm2) are drawn.

As illustrated in FIG. 6A, the flexible substrate of the fourth example is folded along the folding line (BLm). The wirings forming the (m+1)-th coil are laminated on the central space of the m-th coil. Among the wirings forming the (m+1)-th coil, wirings substantially perpendicular to the rotation direction (R) of the motor are laminated on the central space of the m-th coil.

The wirings forming the (m+1)-th upper coil (CFm1) are laminated on the central space of the m-th upper coil (CFm). Among the wirings forming the upper coil (CF), wirings substantially perpendicular to the rotation direction (R) of the motor are laminated on the central space.

The wirings forming the (m+1)-th lower coil (CSm1) are laminated on the central space of the m-th upper coil (CFm). Among the wirings forming the lower coil (CS), wirings substantially perpendicular to the rotation direction (R) of the motor are laminated on the central space.

By laminating the wirings perpendicular to the rotation direction (R) of the motor on the central space, the torque of the motor can be increased.

FIG. 6B illustrates how the m-th coil (C) and the (m+1)-th coil (C) overlap each other. FIG. 6B illustrates the m-th upper coil (CFm) and the (m+1)-th upper coil (CFm1).

As illustrated in FIGS. 6A and 6B, the wirings forming the (m+1)-th upper coil (CFm1) are laminated on the central space of the m-th upper coil (CFm). Among the wirings forming the upper coil (CF), wirings substantially perpendicular to the rotation direction (R) of the motor are laminated on the central space. By laminating the wirings perpendicular to the rotation direction (R) of the motor on the central space, the torque of the motor can be increased.

The wiring groups forming the (m+1)-th upper coil (CFm1) are laminated on the central space of the m-th upper coil (CFm). Among the wirings forming the upper coil (CF), wiring groups substantially perpendicular to the rotation direction (R) of the motor are laminated on the central space. By laminating the wiring groups perpendicular to the rotation direction (R) of the motor on the central space, the torque of the motor can be increased.

Among the wirings forming the next upper coil, wirings substantially perpendicular to the rotation direction (R) of the motor are laminated on the central space of the previous upper coil. The wirings laminated on the central space are the first wirings 251 or the third wirings 253. The wirings laminated on the central space are of the first wiring group (251g) or the third wiring group (253g).

In FIGS. 6A and 6B, the flexible substrate 22 of the fourth example is folded such that the third wiring group (253gm1) of the (m+1)-th upper coil (CFm1) is positioned on the central space of the m-th upper coil (CFm). The third wiring group (253gm1) of the (m+1)-th upper coil (CFm1) is laminated on the central space of the m-th upper coil (CFm).

As illustrated in FIG. 6A, the flexible substrate of the fourth example is folded along the folding line (BLm1). The wirings forming the (m+2)-th coil are laminated on the central space of the (m+1)-th coil. Among the wirings forming the (m+2)-th coil, wirings substantially perpendicular to the rotation direction (R) of the motor are laminated on the central space of the (m+1)-th coil.

In FIGS. 6A and 6C, the flexible substrate 22 of the fourth example is folded such that the first wiring group (251gm2) of the (m+2)-th lower coil (CSm2) is positioned on the central space of the (m+1)-th lower coil (CSm1). The first wiring group (251gm2) of the (m+2)-th lower coil (CSm2) is laminated on the central space of the (m+1)-th lower coil (CSm1).

A coil is laminated on a previous coil such that the third wirings 253 are positioned on the central space of the previous coil. A next coil is laminated on the coil laminated on the previous coil such that the third wirings 251 are positioned on the central space of the coil laminated on the previous coil.

In this way, the first wirings 251 and the third wirings 253 are alternately laminated on the central space of the previous coil.

A coil is laminated on a previous coil such that the third wiring group (253g) is positioned on the central space of the previous coil. A next coil is laminated on the coil laminated on the previous coil such that the first wiring group (251g) is positioned on the central space of the coil laminated on the previous coil.

In this way, the first wiring group (251g) and the third wiring group (253g) are alternately laminated on the central space of the previous coil.

The fourth flexible substrate is folded such that wirings substantially perpendicular to the rotation direction (R) of the motor are laminated on the central space of a previous upper coil. Subsequently, the flexible substrate of the fourth example is folded such that wirings substantially perpendicular to the rotation direction (R) of the motor are laminated on the central space of a lower coil.

The flexible substrate of the fourth example is folded such that a wiring group substantially perpendicular to the rotation direction (R) of the motor is laminated on the central space of a previous upper coil. Subsequently, the flexible substrate of the fourth example is folded such that a wiring group substantially perpendicular to the rotation direction (R) of the motor is laminated on the central space of a lower coil.

The flexible substrate of the fourth example is folded such that wirings substantially perpendicular to the rotation direction (R) of the motor are laminated on the central space of a previous coil.

The flexible substrate of the fourth example is folded such that a wiring group substantially perpendicular to the rotation direction (R) of the motor is laminated on the central space of a previous coil.

After that, the folded flexible substrate of the fourth example is wound around the magnet 48. A coil substrate 20 is obtained from the flexible substrate of the fourth example. The first wirings 251 of the upper coils (CF) are substantially perpendicular to the rotation direction (R) of the motor. The third wirings 253 of the upper coils (CF) are substantially perpendicular to the rotation direction (R) of the motor. The first wirings 251 of the lower coils (CS) are substantially perpendicular to the rotation direction (R) of the motor. The third wirings 253 of the lower coils (CS) are substantially perpendicular to the rotation direction (R) of the motor.

m is a natural number.

The connection wirings (cL) connecting the coils (C) each include at least one of a conductor circuit on the first surface (F), a conductor circuit on the second surface (S), and a via conductor penetrating the flexible substrate 22.

It is also possible that the first wirings 251 do not include the inner side first wiring (2511). In this case, the first wiring group (251g) is formed of multiple first wirings 251 and an inner side first wiring (2511).

It is also possible that the second wirings 252 do not include the inner side second wiring (2521). In this case, the second wiring group (252g) is formed of multiple second wirings 252 and an inner side second wiring (2521).

It is also possible that the third wirings 253 do not include the inner side third wiring (2531). In this case, the third wiring group (253g) is formed of multiple third wirings 253 and an inner side third wiring (2531).

It is also possible that the fourth wirings 254 do not include the inner side fourth wiring (2541). In this case, the fourth wiring group (254g) is formed of multiple fourth wirings 254 and an inner side fourth wiring (2541).

It is also possible that the fifth wirings 255 do not include an inner side fifth wiring (2551). In this case, the fifth wiring group (255g) is formed of multiple fifth wirings 255 and an inner side fifth wiring (2551).

It is also possible that the sixth wirings 256 do not include an inner side sixth wiring (2561). In this case, the sixth wiring group (256g) is formed of multiple sixth wirings 256 and an inner side sixth wiring (2561).

The electric motor of Japanese Patent Application Laid-Open Publication No. 2007-124892 includes multiple single coils formed of wires. The coils are formed of wires. When the wires are thin, it is thought to be difficult to wind the wires. For example, it is thought that the wires may break.

A coil substrate for a motor according to an embodiment of the present invention is a coil substrate arranged around a magnet. The coil substrate has coils formed of wirings. The coils each include multiple first wirings and multiple second wirings that respectively extend from the first wirings. The first wirings are parallel to each other. The second wirings are not parallel to the first wirings. The coil substrate is arranged around the magnet such that the first wirings are substantially perpendicular to a rotation direction of the motor.

A motor according to an embodiment of the present invention includes a magnet and a coil substrate surrounding the magnet. The coil substrate has coils formed of wirings. The coils each include multiple first wirings and multiple second wirings that respectively extend from the first wirings. The first wirings are parallel to each other. The second wirings are not parallel to the first wirings. The coil substrate is arranged around the magnet such that the first wirings are substantially perpendicular to a rotation direction of the motor.

A method for manufacturing a motor coil substrate according to an embodiment of the present invention include: forming, on a flexible substrate, multiple coils each having a central space; folding the flexible substrate such that a wiring forming the (m+1)-th coil overlaps the central space of the m-th coil; and arranging the folded flexible substrate around a magnet.

According to an embodiment of the present invention, the coils are formed of wirings. For example, the coils can be formed using a technology for a printed wiring board. Therefore, the wirings can be formed at any angle with respect to the rotation direction of the motor. Further, coils each having different wiring densities within one coil can be formed. For example, a density of wirings that are substantially perpendicular to the rotation direction of the motor is higher than a density of wirings that are not perpendicular to the rotation direction of the motor. Therefore, when the coil substrate of the embodiment of the present invention is used for a motor, a torque of the motor can be increased. A size of the motor can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A coil substrate for a motor, comprising:
   a flexible substrate; and
   a plurality of coils formed on a surface of the flexible substrate,
   wherein each of the coils has a wiring comprising a plurality of first wiring portions, a plurality of second wiring portions extending from the first wirings respectively, a plurality of third wiring portions, and a plurality of fourth wiring portions extending from the third wiring portions respectively and is formed such that the plurality of first wiring portions extends parallel with respect to each other, that the plurality of second wiring portions extends not parallel to the plurality of first wiring portions, that the plurality of third wiring portions is parallel to each other and that the plurality of third wiring portions is not parallel to the plurality of fourth wiring portions, the flexible substrate is configured to be formed around a magnet of a motor such that the plurality of first wiring portions forms an angle that is substantially perpendicular to a rotation direction of the motor and that the plurality of third wiring portions forms an angle that is substantially perpendicular to the rotation direction of the motor, the plurality of coils is formed such that each of the coils has a first space formed between adjacent first wiring portions, a second space formed between adjacent second wiring portions, a third space formed between adjacent third wiring portions, and a fourth space formed between adjacent fourth wiring portions, a width of the first space is equal to or smaller than a width of the second space, a width of the third space is equal to or smaller than a width of the fourth space, and the plurality of coils is formed such that a central space is formed between the plurality of first wiring portions and the plurality of third wiring portions, that a ratio of a width of the central space to the width of the first space is in a range of 200 to 400 and that a ratio of the width of the central space to the width of the third space is in a range of 200 to 400.

2. The coil substrate according to claim 1, wherein the plurality of coils is formed such that a width of each of the first wiring portions is smaller than a width of each of the second wiring portions.

3. The coil substrate according to claim 2, wherein the plurality of coils is formed such that a width of each of the first wiring portions is smaller than a width of each of the second wiring portions and that a width of each of the third wiring portions is smaller than a width of each of the fourth wiring portions.

4. The coil substrate according to claim 3, wherein the plurality of coils is formed such that the width of the first space is equal to the width of the third space, the width of the second space is equal to the width of the fourth space, the width of each of the first wiring portions is equal to the width of each of the third wiring portions, and the width of each of the second wiring portions is equal to the width of each of the fourth wiring portions.

5. The coil substrate according to claim 2, wherein the plurality of coils is formed such that the plurality of second wiring portions is directly connected to the plurality of third wiring portions respectively and that the plurality of first wiring portions is directly connected to the plurality of fourth wiring portions respectively.

6. The coil substrate according to claim 2, further comprising:
   a plurality of second coils formed on the flexible substrate; and
   a plurality of via conductors formed through the flexible substrate,
   wherein the flexible substrate has a first surface forming the surface, and a second surface on an opposite side with respect to the first surface, the plurality of second coils is formed on the second surface of the flexible substrate, and the plurality of coils on the first surface is connected to the plurality of second coils through the plurality of via conductors penetrating the flexible substrate.

7. The coil substrate according to claim 6, wherein the plurality of coils and the plurality of second coils are formed in pairs via the flexible substrate.

8. The coil substrate according to claim 6, wherein the flexible substrate has a plurality of folding lines and is configured to be folded at the plurality of folding lines such that adjacent coils on the first surface partially overlap each other and that the magnet is surrounded by the flexible substrate folded at the folding lines.

9. The coil substrate according to claim 1, wherein the plurality of coils is formed such that a width of each of the first wiring portions is smaller than a width of each of the second wiring portions and that a width of each of the third wiring portions is smaller than a width of each of the fourth wiring portions.

10. The coil substrate according to claim 9, wherein the plurality of coils is formed such that the width of the first space is equal to the width of the third space, the width of the second space is equal to the width of the fourth space, the width of each of the first wiring portions is equal to the width of each of the third wiring portions, and the width of each of the second wiring portions is equal to the width of each of the fourth wiring portions.

11. The coil substrate according to claim 1, wherein the plurality of coils is formed such that the plurality of second wiring portions is directly connected to the plurality of third wiring portions respectively and that the plurality of first wiring portions is directly connected to the plurality of fourth wiring portions respectively.

12. The coil substrate according to claim 1, further comprising:
a plurality of second coils formed on the flexible substrate; and
a plurality of via conductors formed through the flexible substrate,
wherein the flexible substrate has a first surface forming the surface, and a second surface on an opposite side with respect to the first surface, the plurality of second coils is formed on the second surface of the flexible substrate, and the plurality of coils on the first surface is connected to the plurality of second coils through the plurality of via conductors penetrating the flexible substrate.

13. The coil substrate according to claim 12, wherein the plurality of coils and the plurality of second coils are formed in pairs via the flexible substrate.

14. The coil substrate according to claim 12, wherein the flexible substrate has a plurality of folding lines and is configured to be folded at the plurality of folding lines such that adjacent coils on the first surface partially overlap each other and that the magnet is surrounded by the flexible substrate folded at the folding lines.

15. The coil substrate according to claim 1, wherein the flexible substrate is configured to be formed around the magnet of the motor such that a space is formed between the flexible substrate and the magnet of the motor.

16. The coil substrate according to claim 1, wherein the plurality of coils is formed such that the width of the first space is smaller than the width of the second space and that the width of the third space is smaller than the width of the fourth space.

17. A motor, comprising:
a magnet; and
a coil substrate comprising a flexible substrate, and a plurality of coils formed on a surface of the flexible substrate,
wherein each of the coils has a wiring comprising a plurality of first wiring portions, a plurality of second wiring portions extending from the first wirings respectively, a plurality of third wiring portions, and a plurality of fourth wiring portions extending from the third wiring portions respectively and is formed such that the plurality of first wiring portions extends parallel with respect to each other, that the plurality of second wiring portions extends not parallel to the plurality of first wiring portions, that the plurality of third wiring portions is parallel to each other and that the plurality of third wiring portions is not parallel to the plurality of fourth wiring portions, the flexible substrate is configured to be formed around a magnet of a motor such that the plurality of first wiring portions forms an angle that is substantially perpendicular to a rotation direction of the motor and that the plurality of third wiring portions forms an angle that is substantially perpendicular to the rotation direction of the motor, the plurality of coils is formed such that each of the coils has a first space formed between adjacent first wiring portions, a second space formed between adjacent second wiring portions, a third space formed between adjacent third wiring portions, and a fourth space formed between adjacent fourth wiring portions, a width of the first space is equal to or smaller than a width of the second space, a width of the third space is equal to or smaller than a width of the fourth space, and the plurality of coils is formed such that a central space is formed between the plurality of first wiring portions and the plurality of third wiring portions, that a ratio of a width of the central space to the width of the first space is in a range of 200 to 400 and that a ratio of the width of the central space to the width of the third space is in a range of 200 to 400.

18. The motor according to claim 9, wherein the plurality of coils is formed such that a width of each of the first wiring portions is smaller than a width of each of the second wiring portions.

19. The motor according to claim 17, wherein the coil substrate further comprises a plurality of second coils formed on the flexible substrate, and a plurality of via conductors formed through the flexible substrate such that the flexible substrate has a first surface forming the surface, and a second surface on an opposite side with respect to the first surface, that the plurality of second coils is formed on the second surface of the flexible substrate, and that the plurality of coils on the first surface is connected to the plurality of second coils through the plurality of via conductors penetrating the flexible substrate.

20. A method for manufacturing a motor coil substrate, comprising:
forming, on a flexible substrate, a plurality of coils such that each of the coils has a central space;
folding the flexible substrate at a plurality of folding lines formed such that a wiring forming a (m+1)-th coil overlaps the central space of a m-th coil, where m is a natural number; and
positioning the flexible substrate folded at the folding lines around a magnet of a motor,
wherein each of the coils has a wiring comprising a plurality of first wiring portions, a plurality of second wiring portions extending from the first wirings respectively, a plurality of third wiring portions, and a plurality of fourth wiring portions extending from the third wiring portions respectively and is formed such that the plurality of first wiring portions extends parallel with respect to each other, that the plurality of second wiring portions extends not parallel to the plurality of first wiring portions, that the plurality of third wiring portions is parallel to each other and that the plurality of third wiring portions is not parallel to the plurality of fourth wiring portions, the flexible substrate is configured to be formed around a magnet of a motor such that the plurality of first wiring portions forms an angle that is substantially perpendicular to a rotation direction of the motor and that the plurality of third wiring portions forms an angle that is substantially perpendicular to the rotation direction of the motor, the plurality of coils is formed such that each of the coils has a first space formed between adjacent first wiring portions, a second space formed between adjacent second wiring portions, a third space formed between adjacent third wiring portions, and a fourth space formed between adjacent fourth wiring portions, a width of the first space is equal to or smaller than a width of the second space, a width of the third space is equal to or smaller than a width of the fourth space, and the plurality of coils is formed such that a central space is formed between the plurality of first wiring portions and the plurality of third wiring portions, that a ratio of a width of the central space to the width of the first space is in a range of 200 to 400 and that a ratio of the width of the central space to the width of the third space is in a range of 200 to 400.

* * * * *